United States Patent Office 2,955,498
Patented Oct. 11, 1960

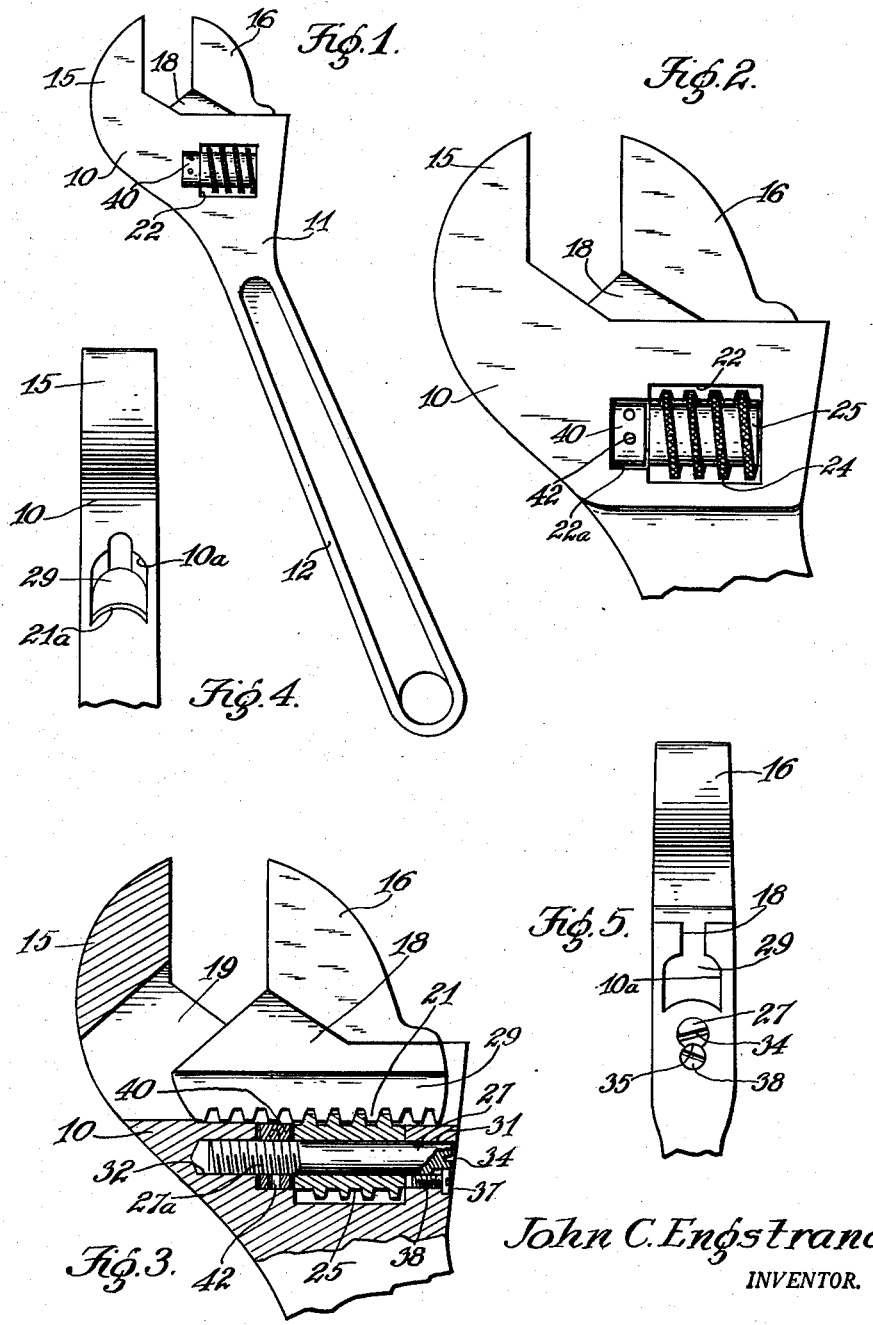

2,955,498

LOCKS FOR CRESCENT WRENCHES

John C. Engstrand, 13138 S. Baltimore Ave., Chicago 33, Ill.

Filed Apr. 13, 1959, Ser. No. 805,849

2 Claims. (Cl. 81—165)

My invention relates to crescent-type wrenches, and more particularly to means for holding the same in a set or adjusted position. Various means have been devised for this purpose, but such mechanisms as have come to my attention are either too involved or delicate, or have parts which project to be in the way or make a wrench bulky or clumsy to handle and in many cases impractical. In view of these conditions it is one object of the present invention to devise a locking device for a crescent-type wrench which is fully contained within the body of the wrench, and with no parts projecting therefrom.

A further object is to provide a locking device which utilizes the pin which forms a bearing for the wrench worm both for purposes of support and for threading action in order to lock the worm at any desired point in its adjustment.

A still further object is to provide a ring which functions as a lock nut for the worm, and position such ring in a pocket or recess which is beyond the environment of the worm.

Another object is to provide for means to rotate the aforesaid ring by drilling the same with circularly-spaced bores to which a handy pin or nail may be applied to rotate the lock nut to lock or release the adjusting worm.

An additional object is to widen the gear rack which is engaged by the ribs of the worm, and to lend the teeth of the rack a profile conforming to the curvature of the worm shank, whereby to mesh the rack and the worm more fully than usual and with wide bearing and wearing surfaces.

A better understanding of the invention may be had by references to the accompanying drawings, in which—

Figure 1 is an elevation of the wrench;

Figure 2 is an enlarged duplication of the head portion of the wrench as seen in Figure 1;

Figure 3 is a view similar to Figure 2, partly broken away to show the operating parts of the wrench;

Figure 4 is a view from the left-hand side of Figure 2; and

Figure 5 is a view from the right-hand side thereof.

Referring specifically to the drawings, 10 denotes the head of the wrench, the lower part of the head being tapered as shown at 11 to form the handle 12. Following the general design of crescent-type wrenches the head is extended toward one side to form a jaw 15; and a companion jaw 16 is located over the other side, such jaw having a shank 18 slidably disposed in a cavity 19 in the upper part of the head.

Usually, the shank 18 of the jaw 16 is formed with a gear rack 21 which depends into an opening 22 through the head to mesh with the spiral teeth 24 of a worm 25; and the worm is journaled on a pin 27 spanning the opening 22 and supported in the stock endwise thereof.

In the present case, the shank 18 of the jaw 16 is widened to form an arch-like base 29 whose underside is formed as the gear rack 21. Figures 4 and 5 show that the stock of the head 10 is chambered on opposite sides of the shank 18 as indicated at 10a to form a bearing for the sliding motion of the base 29; and the teeth of the rack 21 are concaved as indicated at 21a in order to conform to the inner curvature of the worm teeth, the rack teeth of course having the proper angle to conform to the pitch of the worm teeth 24.

In the present case, the pin 27 is directed snugly through an initial bore 31 in the head stock, then receiving the worm 25 rotatably. However, beyond the worm the pin is formed with a thread 27a and screwed into a tapped bore 32 in the stock of the head with a fairly tight fit. However, since it is important that the pin 27 be fixed against rotation, it is made with a screw driver slot 34 in its outer end and recessed from the bottom as indicated at 35 in order to receive the head 37 of a locking screw 38.

A ring-shaped nut 40 is mounted on the threaded portion of the pin 27 which occurs between the inner end of the worm and the stock of the head, in a pocket or continuation 22a of the opening 22. This nut serves for locking the worm at any point to which it has been turned by jamming the worm. Five circularly-spaced holes 42 are drilled in the nut 40 for the application of a handy pin or nail in order to turn the nut as stated.

It will now be apparent that the improved wrench has a number of advantageous features. First, its movable jaw has a wide base slidably fitted in the head of the wrench to render the movable jaw stable during its movement and eliminate side play. Further, the base of the movable jaw has a wide meshing contact with the worm, whereby to transmit motion to the movable jaw with steadiness and accuracy. Further, the nut 40 employs a screw for its support which is the same part as the worm supporting pin 27, making for simplicity and an accurate relation between the nut and the worm. Further, the nut is not extended with a long handle or operating device which projects from the wrench to be in the way or interfere with its proper handling or convenient insertion in narrow places, it being an easy matter to find or keep handy a suitable pin or nail for application to the nut. Finally, the improvements described are contained fully within the body of the wrench, keeping the same in usual form and devoid of projections or complications.

While I have described the invention along specific lines, various minor changes or refinements may be made therein without departing from its principle, and I reserve the right to employ all such changes and refinements as may come within the scope and spirit of the appended claims.

I claim:

1. A crescent-type wrench comprising a head formed with a stationary jaw, a movable jaw with a shank slidable in the head toward and from the stationary jaw, a gear rack carried by said shank, a worm in mesh with the rack, a pin lodged in the head to journal the worm and formed as a screw beyond one end of the worm, and a nut threaded on said screw and rotatable to engage the worm to lock it against rotation at any point to which it has been adjusted, said nut having a circular periphery and being confined within the width of said head, said nut having circumferentially-spaced bores in its periphery for the insertion of a pin to turn the nut.

2. A crescent-type wrench comprising a head formed with a stationary jaw having a transverse opening, a movable jaw with a shank slidable in the head toward and from the stationary jaw, a gear rack carried by said shank, a worm accessible through said opening and in mesh with the rack, a pin lodged in the head parallel to said shank to journal the worm and formed as an axial screw in one end of said opening beyond one end of the worm, and a nut threaded on said screw and rotatable in said opening to engage the worm to lock it against rotation at any point to which it has been adjusted.

References Cited in the file of this patent

UNITED STATES PATENTS

| | | |
|---|---|---|
| 1,414,839 | Stuarts | May 2, 1922 |
| 1,739,715 | Eckland | Dec. 17, 1929 |
| 2,378,854 | Kershaw | June 19, 1945 |
| 2,691,897 | Brynge | Oct. 19, 1954 |
| 2,709,387 | Brynge | May 31, 1955 |
| 2,817,259 | Heuser | Dec. 24, 1957 |

FOREIGN PATENTS

| | | |
|---|---|---|
| 8,437 | Great Britain | 1910 |
| 18,926 | Great Britain | 1907 |

UNITED STATES PATENT OFFICE
Certificate of Correction

Patent No. 2,955,498 October 11, 1960

John C. Engstrand

It is hereby certified that error appears in the above numbered patent requiring correction and that the said Letters Patent should read as corrected below.

In the heading to the drawings, line 2, and in the heading to the printed specification, line 2, title of invention, for "LOCKS FOR CRESCENT WRENCHES", each occurrence, read —LOCKS FOR ADJUSTABLE END WRENCHES—; column 1, lines 15 and 60, for "crescent-type", each occurrence, read —adjustable end—; same column 1, line 24, for "a crescent-type" read —an adjustable end—; column 2, lines 53 and 65, for "A crescent-type", each occurrence, read —An adjustable end—.

Signed and sealed this 11th day of April 1961.

[SEAL]

Attest:
ERNEST W. SWIDER,
*Attesting Officer.*

ARTHUR W. CROCKER,
*Acting Commissioner of Patents.*